US012375843B2

(12) United States Patent
Fujii et al.

(10) Patent No.: US 12,375,843 B2
(45) Date of Patent: Jul. 29, 2025

(54) SOUND OUTPUT DEVICE

(71) Applicant: SONY GROUP CORPORATION, Tokyo (JP)

(72) Inventors: Hiroaki Fujii, Tokyo (JP); Kentaro Kato, Tokyo (JP); Tomohiro Ito, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 287 days.

(21) Appl. No.: 18/001,739

(22) PCT Filed: Apr. 30, 2021

(86) PCT No.: PCT/JP2021/017284
§ 371 (c)(1),
(2) Date: Dec. 14, 2022

(87) PCT Pub. No.: WO2021/261084
PCT Pub. Date: Dec. 30, 2021

(65) Prior Publication Data

US 2023/0300507 A1 Sep. 21, 2023

(30) Foreign Application Priority Data

Jun. 25, 2020 (JP) ................................ 2020-109931

(51) Int. Cl.
*H04R 25/00* (2006.01)
*H04R 1/10* (2006.01)

(52) U.S. Cl.
CPC ......... *H04R 1/1016* (2013.01); *H04R 1/1041* (2013.01); *H04R 1/1075* (2013.01); *H04R 2420/07* (2013.01); *H04R 2460/11* (2013.01)

(58) Field of Classification Search
CPC ... H04R 1/1016; H04R 1/1041; H04R 1/1075
See application file for complete search history.

(56) References Cited

U.S. PATENT DOCUMENTS

2011/0103636 A1* 5/2011 Pelland .................. H04R 1/105 381/380
2012/0057739 A1* 3/2012 Smith .................... H04R 1/105 381/379

(Continued)

FOREIGN PATENT DOCUMENTS

JP 60-022895 A 2/1985
JP 2012-257049 A 12/2012

(Continued)

OTHER PUBLICATIONS

International Search Report and Written Opinion of PCT Application No. PCT/JP2021/017284, issued on Jun. 29, 2021, 09 pages of ISRWO.

*Primary Examiner* — Simon King
(74) *Attorney, Agent, or Firm* — CHIP LAW GROUP

(57) ABSTRACT

Provided is a sound output device including a drive unit that has a sound output section inside and that is formed in an annular shape and an electric unit that has a drive control section inside and that is coupled to the drive unit. A space inside the drive unit is formed as an intake hole that takes in an external sound. The sound output device is attached to an ear with the drive unit inserted into a cavum concha. Accordingly, in a state in which the electric unit is coupled to the drive unit and the drive unit is inserted into the cavum concha to be attached to the ear, an external sound taken in from the intake hole that is the space inside the drive unit goes to the external auditory canal. Therefore, a stable and favorable wearing state on the ear can be ensured, and at the same time, a state in which an external sound is taken in naturally can be ensured.

11 Claims, 13 Drawing Sheets

(56) References Cited

U.S. PATENT DOCUMENTS

| | | | | |
|---|---|---|---|---|
| 2012/0064845 | A1* | 3/2012 | Smith | H04R 1/1016 381/74 |
| 2019/0037296 | A1 | 1/2019 | Mihara | |
| 2019/0174216 | A1* | 6/2019 | Mihara | H04R 25/656 |
| 2019/0238965 | A1 | 8/2019 | Enamito | |
| 2021/0014594 | A1* | 1/2021 | Kosaka | H04R 1/105 |
| 2021/0195312 | A1* | 6/2021 | Woo | H04R 1/1058 |
| 2021/0377643 | A1* | 12/2021 | Igarashi | H04R 1/42 |
| 2022/0223133 | A1* | 7/2022 | McCutcheon | G10K 11/17825 |

FOREIGN PATENT DOCUMENTS

| | | | |
|---|---|---|---|
| JP | 2015-207928 | A | 11/2015 |
| JP | 2016-528855 | A | 9/2016 |
| JP | 2019-134237 | A | 8/2019 |
| JP | 2019146275 | A | 8/2019 |
| WO | WO-2017134968 | A1 | 8/2017 |
| WO | WO-2019187610 | A1 | 10/2019 |
| WO | 2020/121608 | A1 | 6/2020 |

* cited by examiner

SOUND OUTPUT DEVICE

CROSS REFERENCE TO RELATED APPLICATIONS

This application is a U.S. National Phase of International Patent Application No. PCT/JP2021/017284 filed on Apr. 30, 2021, which claims priority benefit of Japanese Patent Application No. JP 2020-109931 filed in the Japan Patent Office on Jun. 25, 2020. Each of the above-referenced applications is hereby incorporated herein by reference in its entirety.

TECHNICAL FIELD

The present technique relates to the technical field of a sound output device that is attached to an ear to be used to output sounds.

BACKGROUND ART

There are sound output devices that are attached to ears and used as headphones or earphones to output sounds from sound output sections, and in recent years, modes of the sound output devices for being used outdoors are also increasing in addition to modes for being used indoors.

It is desired that such a sound output device be capable of ensuring a stable and favorable wearing state in consideration of constant wearing and long-time wearing at the time of, for example, going out and naturally taking in an external sound at the same time.

Therefore, as a sound output device capable of taking in an external sound as described above, there is one at least a part of which is inserted into a cavum concha and in which a through hole is formed in a portion to be attached to the ear (See, for example, PTL 1 or PTL 2).

In a sound output device described in PTL 1, a speaker unit having a diaphragm and a magnetic circuit is arranged inside a housing, the housing is inserted into the cavum concha, and the sound output device is thereby attached to the ear. The housing has a vent hole on the external auditory canal side and a through hole on the opposite side of the external auditory canal. An external sound is taken into the inside of the housing through the through hole, passes through the diaphragm, and then goes from the vent hole to the external auditory canal.

In a sound output device described in PTL 2, a housing has a tubular portion and a transmission member, one end of the tubular portion having a through hole is inserted into a cavum concha, and the sound output device is thereby attached to the ear. A speaker unit having a vibrating body and a sound conversion element is arranged inside the transmission member, and a vibration member that vibrates in reaction to acoustic vibration transmitted from the sound conversion element is arranged inside the tubular portion. The external sound passes through the inside of the tubular portion and goes to the external auditory canal.

CITATION LIST

Patent Literature

[PTL 1]
Japanese Patent Laid-open No. Sho 60-22895
[PTL 2]
Japanese Patent Laid-open No. 2015-207928

SUMMARY

Technical Problems

Incidentally, as described above, since it is desired that the sound output device ensure a stable and favorable wearing state in consideration of constant wearing and long-time wearing at the time of, for example, going out and naturally take in an external sound, it is desirable that the external sound be naturally taken in regardless of whether or not the sound is output from the speaker unit.

In this respect, in the sound output device having such configuration as described in PTL 1, since the external sound taken into the inside of the housing through the through hole goes to the external auditory canal through the diaphragm, the external sound to be heard by a user may be affected by the diaphragm because the diaphragm is present in the path of the external sound. Therefore, there is a possibility that the external sound is prevented from being naturally taken in.

Further, as in PTL 2, in the configuration in which the one end of the tubular portion of the housing is inserted into the cavum concha and the sound output device is attached to the ear, a portion, of the tubular portion, other than the one end is allowed to protrude outward from the ear, and therefore, there is a risk that the wearing state on the ear may become unstable. In particular, only the vibration member is arranged inside the tubular portion inserted into the cavum concha, and the speaker unit having the vibrating body and the sound conversion element is arranged inside the transmission member located outside the ear. Therefore, the weight of the portion located outside the ear tends to be heavy, and the wearing state on the ear may become more unstable.

As such, an object of the sound output device of the present technique is to ensure a stable and favorable wearing state on the ear and to ensure a state in which the external sound is naturally taken in at the same time.

Solution to Problems

Firstly, the sound output device according to the present technique includes a drive unit that has a sound output section inside and that is formed in an annular shape and an electric unit that has a drive control section inside and that is coupled to the drive unit. A space inside the drive unit is formed as an intake hole that takes in an external sound. The sound output device is attached to an ear with the drive unit inserted into a cavum concha.

Owing to this, in the state in which the electric unit is coupled to the drive unit and the drive unit is inserted into the cavum concha to be attached to the ear, the external sound taken in from the intake hole which is a space inside the drive unit is directed to the external auditory canal.

Secondly, in the above-mentioned sound output device, it is desirable that the electric unit be coupled to the drive unit at a portion at which the intake hole is not blocked.

Owing to this, the entire intake hole is open without being blocked by the electric unit.

Thirdly, in the above-mentioned sound output device, it is desirable that the electric unit be coupled to the drive unit in a state in which a part of the electric unit overlaps the drive unit in an axial direction of the intake hole.

Owing to this, a step portion is formed between the drive unit and the electric unit, so that the electric unit is pressed against the crus helicis without a sense of discomfort in a state of being attached to the ear.

Fourthly, in the above-mentioned sound output device, it is desirable that the drive unit and the electric unit be arranged at an ear concha with the sound output device attached to the ear.

Owing to this, the drive unit and the electric unit do not protrude from the auricle in a state in which the sound output device is attached to the ear.

Fifthly, in the above-mentioned sound output device, it is desirable that the outer surface of the drive unit be formed in a curved surface.

Owing to this, the curved surface of the drive unit comes into contact with various parts of the ear in the state of being attached to the ear.

Sixthly, in the above-mentioned sound output device, it is desirable that the outer surface of the electric unit be formed in a curved surface or a flat surface.

Owing to this, the curved surface or the flat surface of the electric unit comes into contact with various parts of the ear in a state of being attached to the ear.

Seventhly, in the above-mentioned sound output device, it is desirable that the electric unit be formed in a shape having a central axis and that the central axis of the electric unit be inclined with respect to a central axis of the intake hole.

Owing to this, the electric unit is positioned in an inclined state with respect to the drive unit, and the drive unit and the electric unit can each be positioned in the optimum orientation according to the shape of the ear.

Eighthly, in the above-mentioned sound output device, it is desirable that the drive unit be formed in an annular shape.

Owing to this, the portion to be inserted into the cavum concha is made in an annular shape, and the drive unit can easily be inserted into the cavum concha regardless of the shape and size of the ear.

Ninthly, in the above-mentioned sound output device, it is desirable that an opening/closing lid that opens and closes the intake hole be provided.

Owing to this, the intake hole is opened and closed by the opening/closing lid.

Tenthly, in the above-mentioned sound output device, it is desirable that the opening/closing lid be housed in the electric unit at an open position where the intake hole is open.

Owing to this, the opening/closing lid is not located outside the drive unit and the electric unit at the open position.

Eleventhly, in the above-mentioned sound output device, it is desirable that the electric unit be provided with an attachment assist body which is attachable to and detachable from the electric unit and that the attachment assist body be made elastically deformable.

This makes it possible to attach the sound output device to the ear with a part of the attachment assist body being in contact with a part of the ear.

Twelfthly, in the above-mentioned sound output device, it is desirable that an antenna for wireless communication be arranged inside the electric unit.

This makes it possible to perform wireless communication by use of the antenna.

DESCRIPTION OF EMBODIMENT

Hereinafter, an embodiment for implementing a sound output device of the present technique will be described with reference to the accompanying drawings. The sound output device of the present technique is used as a headphone or an earphone.

It should be noted that the sound output device described below is provided with a drive unit and an electric unit, that the drive unit is formed in an annular shape, for example, a ring shape, and that, when the direction is indicated in the following description, the front-back, up-down, and right-left directions are indicated with the axial direction of the drive unit regarded as the right-left direction.

However, the front-back, up-down, right-left directions described below are for convenience of explanation, and regarding the implementation of the present technique, directions are not limited to these.

<Ear Structure>

Figure 1:
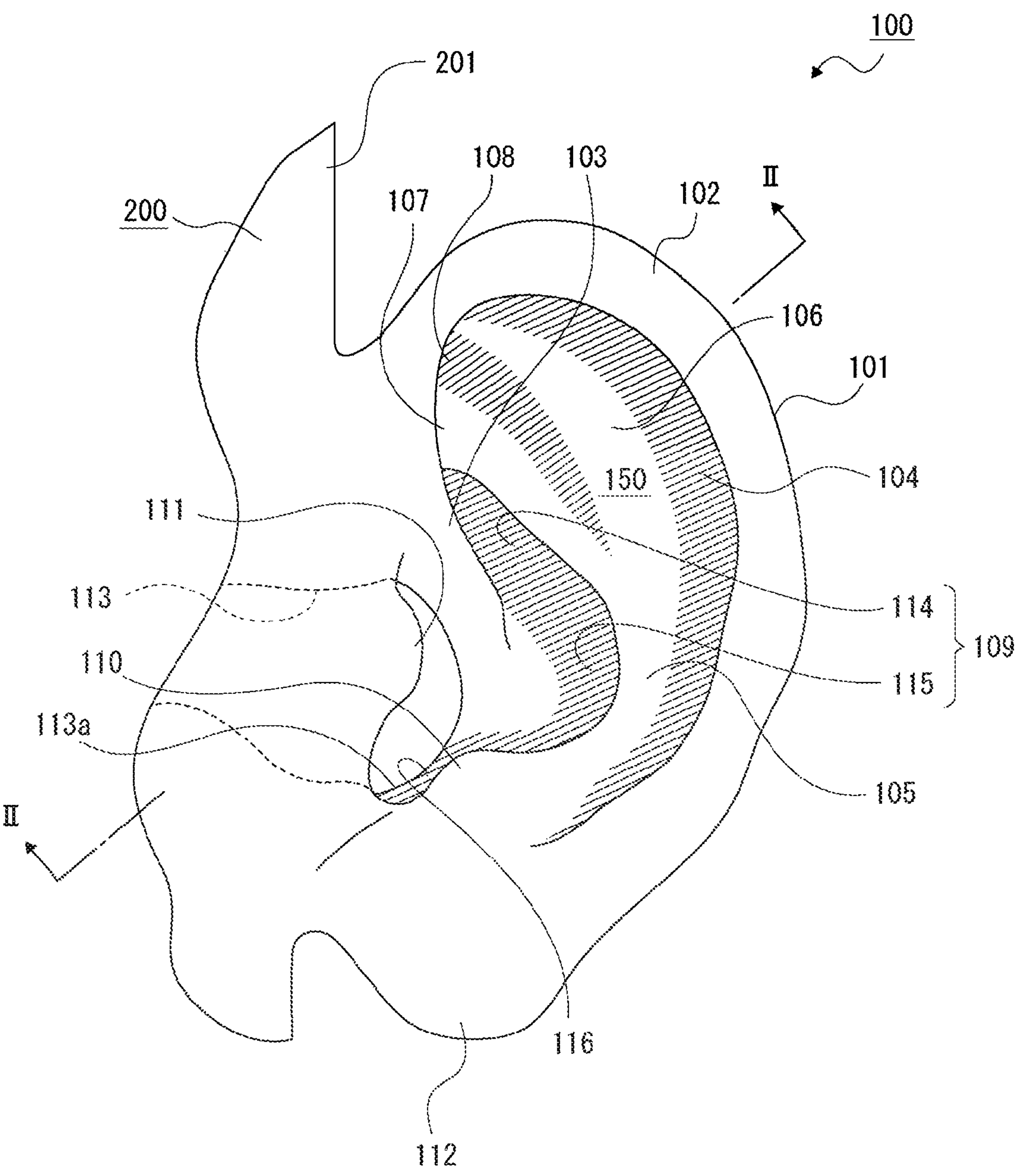
FIG. 1 illustrates an embodiment of a sound output device of the present technique together with FIGS. 2 to 16, and is a perspective view of an ear to which the sound output device is attached.
Figure 2:
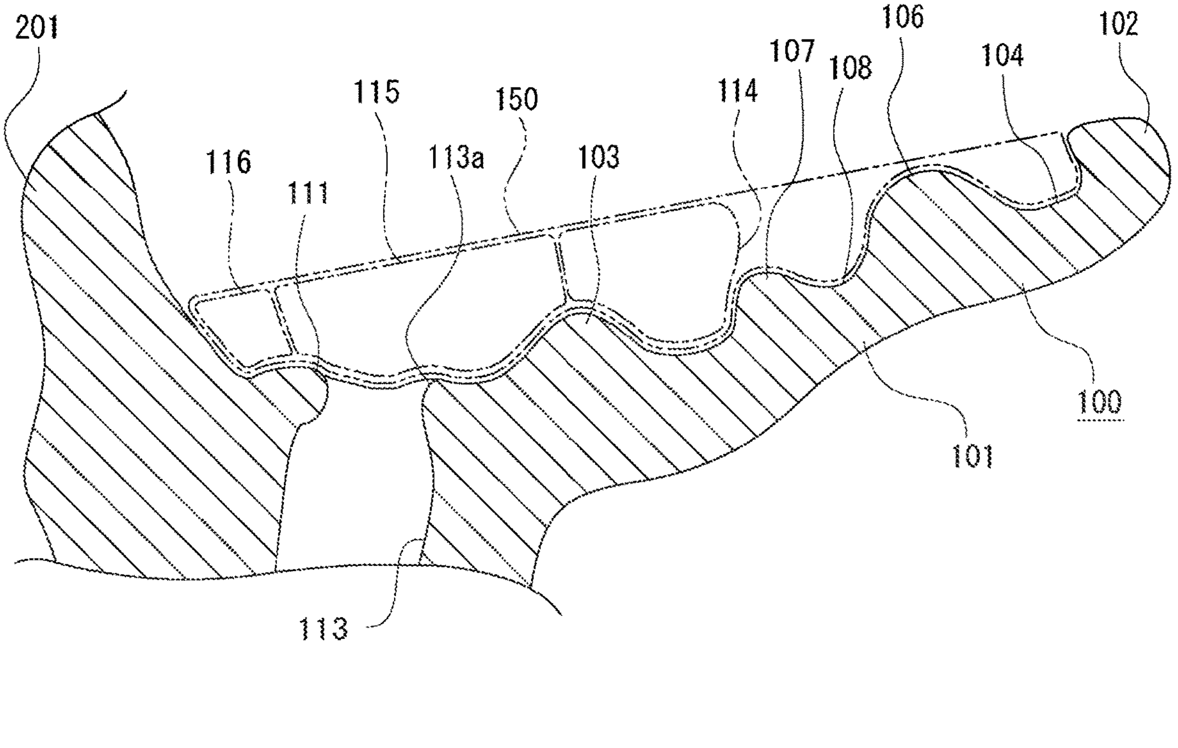
FIG. 2 is a cross-sectional view taken along a line II-II of FIG. 1.

First, the structure of an ear to which the sound output device is attached will be described (see FIGS. 1 and 2).

Ears 100 are parts of a head 200, and include auricles 101 and such parts as eardrums, semicircular canals, and cochleae each existing inside the head 200. Portions, of the head 200, on the inner sides of the auricles 101 are each temporal regions 201, and the auricles 101 project to the left and the right from the temporal regions 201, respectively.

The auricle 101 is formed in a shallow recessed shape that is opened substantially to the left or to the right on the whole to have an inner space 150, and the outer periphery of the auricle 101 has a portion called a helix 102 and a protruded portion called a crus helicis 103 which is continuous with the helix 102 and located in the vicinity of the temporal region 201.

An inner portion of the helix 102 is referred to as a navicular fossa 104 having a recessed shape, and a substantially lower half portion inside the navicular fossa 104 is referred to as an antihelix 105 having a protruded shape. Above the antihelix 105, there is a bifurcated protruded portion continuous with the antihelix 105, and the outer and inner parts of the bifurcated portion are called an antihelix upper crus 106 and an antihelix lower crus 107, respectively. A portion between the antihelix upper crus 106 and the antihelix lower crus 107 is referred to as a triangular fossa 108 having a recessed shape, and an inner portion of the antihelix 105 and the antihelix lower crus 107 is referred to as an ear concha 109 having a recessed shape.

A portion continuous with the lower side of the antihelix 105 is slightly bulged toward the temporal region 201 side and is a portion called an antitragus 110. A portion, on the temporal region 201 side, facing the antitragus 110 is referred to as a tragus 111 slightly bulging toward the antitragus 110, and the lower end continuous with the lower side of the helix 102 is referred to as an earlobe 112.

An external auditory pore 113*a*, which is the entrance of an external auditory canal 113, exists in a portion between the antitragus 110 and the tragus 111, and the external auditory canal 113 communicates with the eardrum, the semicircular canal, or the like.

In the inner space 150, a space surrounded by the antihelix lower crus 107 and the crus helicis 103 is called a cymba concha 114, a space below the cymba concha 114 is called a cavum concha 115, and further, the cymba concha 114 and the cavum concha 115 are parts of the ear concha 109. The cavum concha 115 communicates with the external auditory pore 113*a* of the external auditory canal 113. In the inner space 150, a space that is continuous with the lower side of the cavum concha 115 and opens in a U shape is a space called an intertragic notch 116.

The inner space 150 of the auricle 101 is a space that includes the cymba concha 114, the cavum concha 115, and the intertragic notch 116, and also includes a space on the side having the navicular fossa 104, the antihelix 105, the antihelix upper crus 106, the antihelix lower crus 107, and the triangular fossa 108.

<Configuration of Sound Output Device>

Next, the configuration of sound output devices 1 will be described (see FIGS. 3 to 5).

The sound output devices 1 are used in pairs, including one for the left ear and the other for the right ear, for example. However, only one sound output device 1 may be used to listen to sounds.

The sound output device 1 contains required parts arranged inside a housing 2, and the housing 2 includes a first case 3 and a second case 4. An unillustrated operation section is arranged on the housing 2. The operation section may be a push button type operation section or a sensing operation section such as a touch panel, for example.

The first case 3 is formed in an annular shape having a through hole extending substantially in the right-left direction, and an entire outer surface 3*a* is formed into an outwardly convex curved surface, for example. Each required part is arranged inside the first case 3, and a drive unit 5 includes the first case 3 and each part arranged inside the first case 3.

The drive unit 5 is formed in an annular shape (doughnut shape), the space inside the drive unit 5 is formed as an intake hole 5*a* for taking in an external sound, and the intake hole 5*a* is a through hole extending in the right-left direction. Incidentally, the drive unit 5 may have any shape as long as the shape is annular, and, for example, the outer shape of the drive unit 5 may be formed in another shape such as an elliptical shape or an oval shape.

Right and left side surfaces 4*a* of the outer surface of the second case 4 are each formed into a flat surface or an outwardly convex, gently curved surface, for example, and an outer peripheral surface 4*b* that is a portion, of the outer surface, between the side surfaces 4*a* is formed into an outwardly convex curved surface, for example. Each required part is arranged inside the second case 4, and an electric unit 6 includes the second case 4 and each part arranged inside the second case 4.

Figure 3:
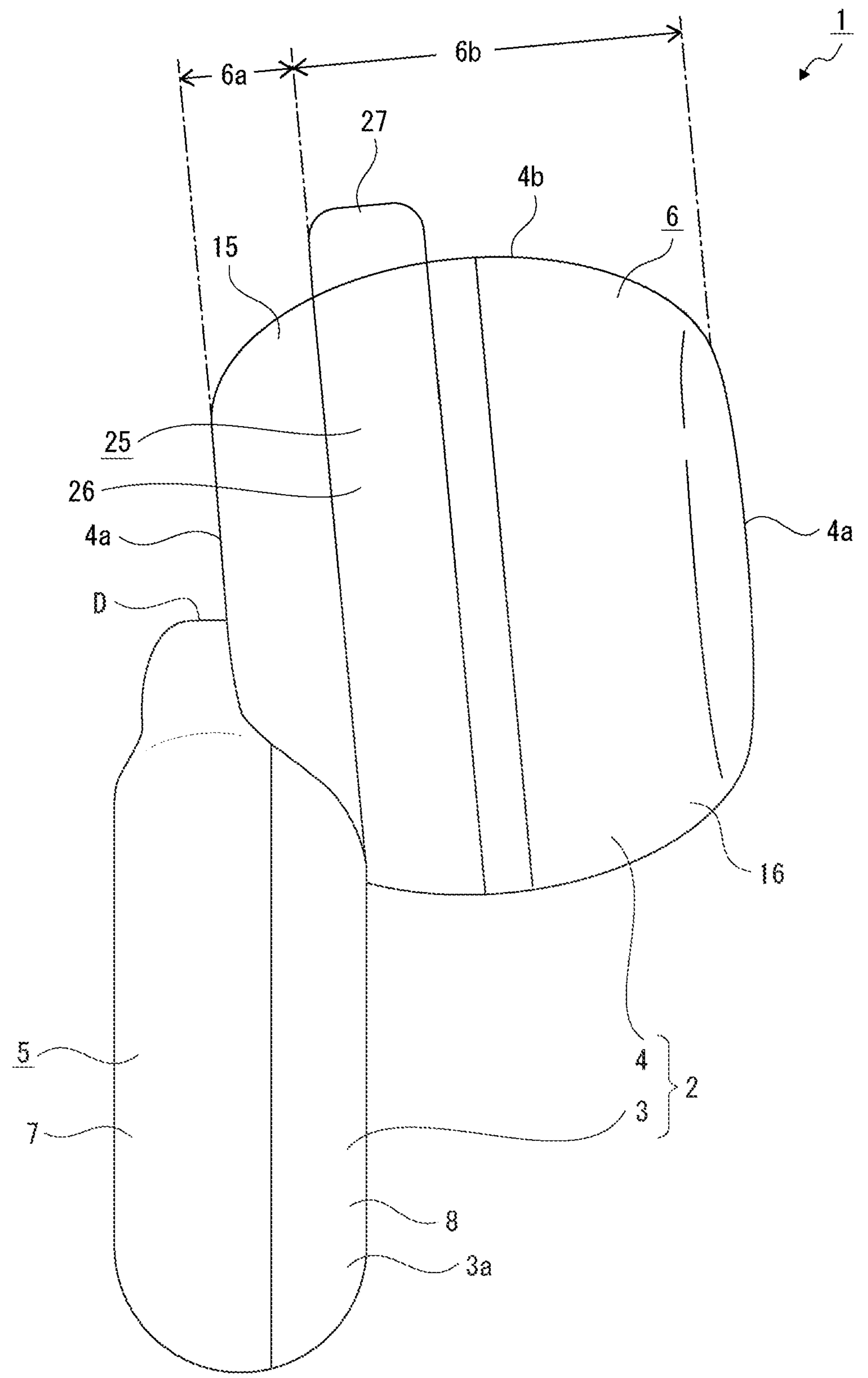
FIG. 3 is a front view of the sound output device.
Figure 5:
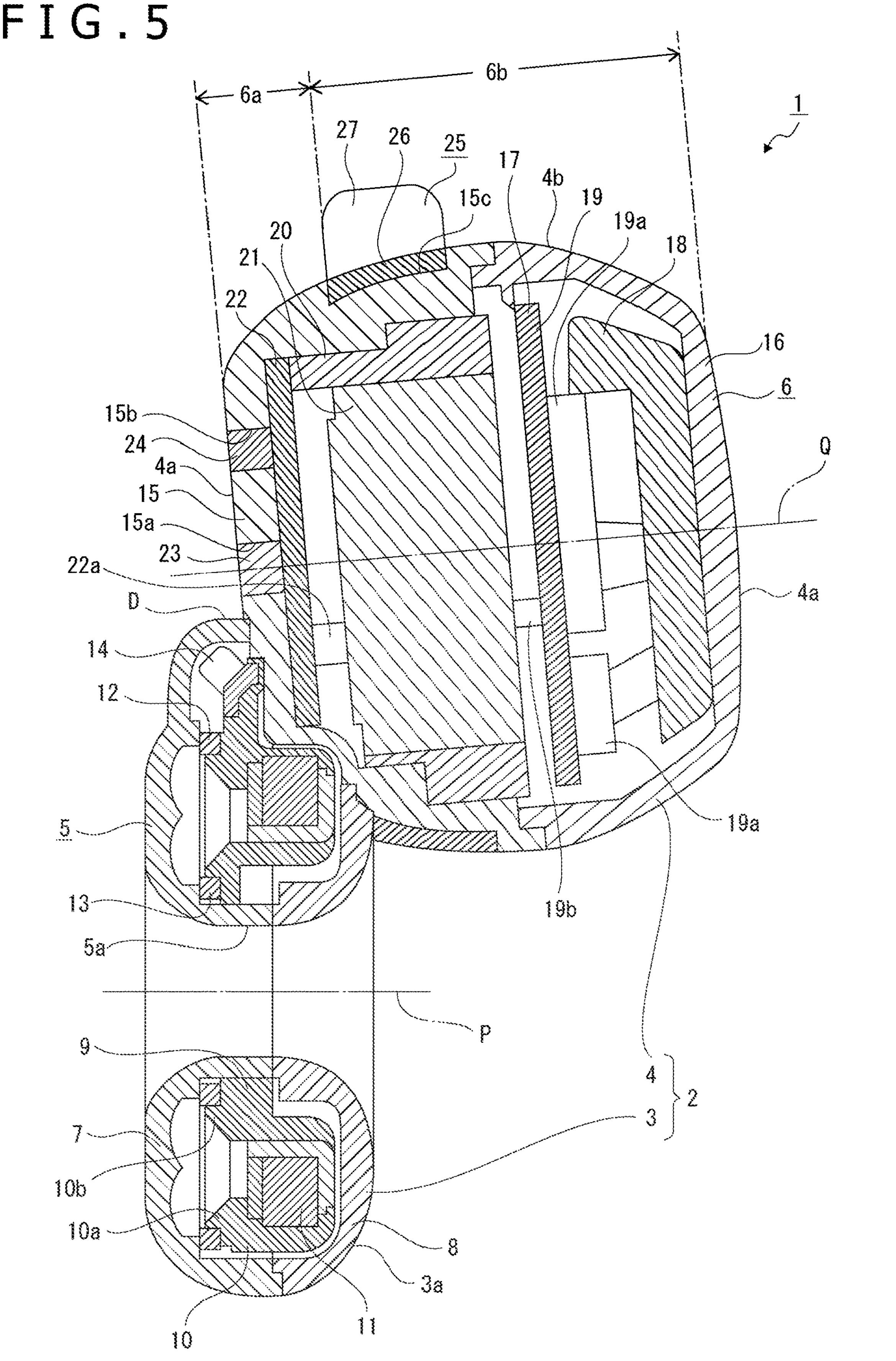
FIG. 5 is a cross-sectional view of the sound output device.

The drive unit 5 and the electric unit 6 are partially coupled, so that, for example, the lower end of the second case 4 of the electric unit 6 is coupled to the upper end of the first case 3 of the drive unit 5, and a portion of the electric unit 6 excluding one end 6*a* in the right-left direction is provided as a protrusion 6*b* protruding laterally from the drive unit 5 (see FIGS. 3 and 5). To be specific, the sound output device 1 is configured such that, in a state of being attached to the ear 100, the protrusion 6*b* of the electric unit 6 is located outside the drive unit 5 in the right-left direction.

As described above, the sound output device 1 has a configuration in which the lower end of the second case 4 is coupled to the upper end of the first case 3 and in which the protrusion 6*b* is located outside the drive unit 5 in the right-left direction. Therefore, a step portion D is formed between the one end 6*a* and the drive unit 5. When the sound output device 1 is attached to the ear 100, the crus helicis 103 is positioned at the step portion D.

As described above, the drive unit 5 is formed in an annular shape and has a shape having a central axis P (see FIG. 5). Further, the electric unit 6 is also formed in a shape having a central axis Q, and the central axis Q of the electric unit 6 is in a slightly inclined state with respect to the central axis P of the drive unit 5, for example. However, in the sound output device 1, the central axis P of the drive unit 5 and the central axis Q of the electric unit 6 may be parallel to each other.

The first case 3 includes an inner housing portion 7 and an outer housing portion 8 being connected to each other in the right-left direction. Multiple unillustrated sound output holes are formed on the inner housing portion 7 to be separated from each other in the circumferential direction. An annular sound output section 9 is arranged inside the first case 3. The sound output section 9 has a dynamic type driver unit.

The sound output section 9 has a holding case 10, a magnetic drive section 11, an outer ring 12, and an inner ring 13.

Annular coupling protrusions 10*a* and 10*b* are provided at one end of the holding case 10 in the right-left direction. The coupling protrusion 10*a* has a larger diameter than that of the coupling protrusion 10*b* and is located on the outer peripheral side of the coupling protrusion 10*b*. The magnetic drive section 11 has a magnet and a yoke, and is held in the holding case 10. The outer ring 12 and the inner ring 13 are housed inside the inner housing portion 7, and the diameter of the outer ring 12 is larger than the diameter of the inner ring 13. The outer ring 12 and the inner ring 13 have an inner peripheral portion and an outer peripheral portion coupled to the coupling protrusion 10*a* and the coupling protrusion 10*b*, respectively, and are attached to the holding case 10.

An unillustrated diaphragm is attached to the outer ring 12 and the inner ring 13. Therefore, in the sound output section 9, the driving force of the magnetic drive section 11 is transmitted to the diaphragm, the diaphragm is vibrated, and sounds are thereby output from the sound output holes.

A connection terminal 14 is attached to the upper end of the holding case 10. A current or a signal is input to the magnetic drive section 11 held in the holding case 10, from a substrate to be described later via the connection terminal 14.

The second case 4 includes an inner arrangement portion 15 and an outer arrangement portion 16 being connected to each other in the right-left direction. The inner arrangement portion 15 is provided with a terminal arrangement hole 15*a* and a sensor arrangement hole 15*b*, each of which is a through hole extending in the right-left direction. An annular mounting groove 15*c* is formed in the inner arrangement portion 15. A microphone hole 16*a* passing through in the right-left direction is formed in the outer arrangement portion 16. A drive control section 17 is arranged inside the second case 4.

The drive control section 17 has a base plate 18, a main substrate 19, a holder 20, a battery 21, and a sub-substrate 22.

The base plate 18 and the main substrate 19 are arranged inside the outer arrangement portion 16, and the base plate 18 is arranged on the side away from the drive unit 5 in the right-left direction with respect to the main substrate 19. An unillustrated antenna and one or multiple unillustrated microphones are attached to the base plate 18. A wireless signal from an external wireless communication device is input to the antenna, a sound is input to the microphone via the microphone hole 16*a*, and the antenna and the microphone are electrically connected to the main substrate 19. The antenna has a function of performing wireless communication by transmitting and receiving sound signals.

By providing the sound output device 1 with an antenna and a microphone, a conversation by wireless communication can be held. As the microphone, for example, a MEMS (Micro Electrical Mechanical Systems) microphone is used.

Multiple electronic components 19*a* are mounted on both sides of the main substrate 19, and a contact portion 19*b* is connected to one side.

The holder 20 and the battery 21 are arranged inside the inner arrangement portion 15, and the battery 21 is held in the holder 20. The battery 21 is connected to the main substrate 19 by the contact portion 19*b*.

The sub-substrate 22 is located on the opposite side of the main substrate 19 with respect to the battery 21, and is arranged inside the inner arrangement portion 15. A contact portion 22*a* is connected to a surface of the sub-substrate 22 on the battery 21 side, and the battery 21 is connected to the sub-substrate 22 through the contact portion 22*a*.

For example, the battery 21 is formed in a columnar shape whose axial direction is the right-left direction, and the main substrate 19 and the sub-substrate 22 are both arranged inside the second case 4 in a state of facing the right-left direction. Therefore, since the main substrate 19 and the sub-substrate 22 are arranged in parallel in the axial direction of the battery 21, the internal space of the second case 4 is effectively utilized, and the sound output device 1 is miniaturized.

A charging terminal 23 and a sensor 24 are connected to a surface of the sub-substrate 22, the surface being opposite to the battery 21. The charging terminal 23 is arranged in a state of being inserted into the terminal arrangement hole 15*a*, and the sensor 24 is arranged in a state of being inserted in the sensor arrangement hole 15*b*.

The charging terminal 23 is connected to an unillustrated charging device, and the charging device charges the battery 21. The sensor 24 has a function of detecting the state of attachment of the sound output device 1 to the ear 100, and the sensor 24 detects that the sound output device 1 is attached to the ear 100.

The sub-substrate 22 is electrically connected to the connection terminal 14 arranged inside the first case 3.

Figure 4:
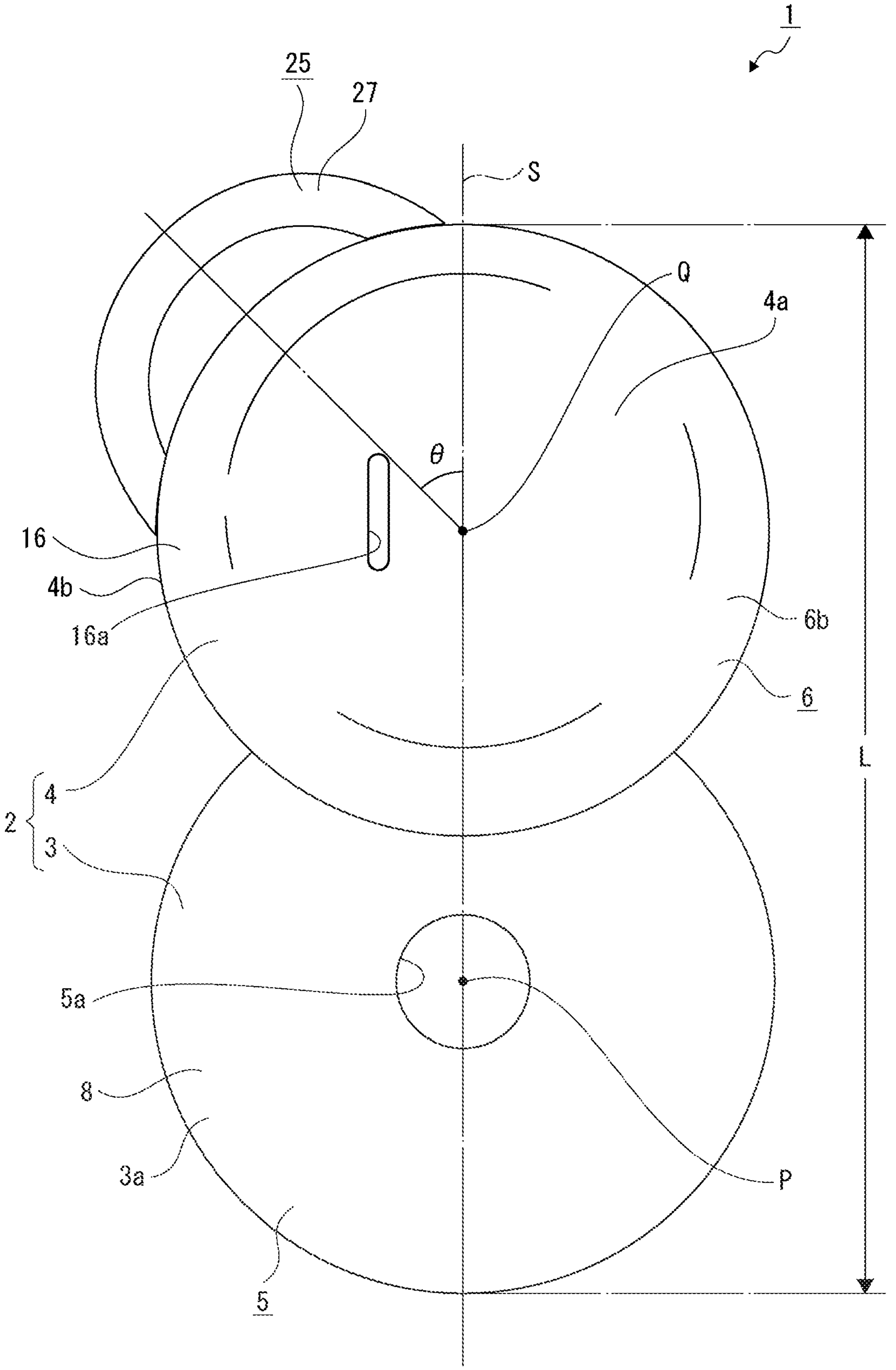
FIG. 4 is a side view of the sound output device.

An attachment assist body 25 is configured to be attachable to and detachable from the second case 4 (see FIGS. 3 to 5).

The attachment assist body 25 is attachable to and detachable from the inner arrangement portion 15, and is formed by use of such a material as silicon or an elastomer to be elastically deformable, for example. The attachment assist body 25 is made by an annular mounted portion 26 attached to the inner arrangement portion 15 and a support portion 27 to be fitted to a part of the ear 100 being integrally formed. The attachment assist body 25 is mounted on the second case 4 when the mounted portion 26 is inserted into the mounting groove 15*c* of the inner arrangement portion 15.

The support portion 27 is formed in a substantially arc shape protruding outward with respect to the mounted portion 26, and both ends thereof are each continuous with the outer peripheral surface of the mounted portion 26.

The support portion 27 of the attachment assist body 25 is formed of a material having hardness lower than that of the mounted portion 26, for example. Therefore, the support portion 27 is more easily elastically deformed than the mounted portion 26, and high strength is ensured for the mounted portion 26.

The mounted portion 26 is elastically deformed to have a large diameter and elastically restored to have a small diameter, so that the mounted portion 26 is attached to the inner arrangement portion 15 in a state of being inserted into the mounting groove 15*c*.

<Attachment of Sound Output Device to Ear>

Figure 6:
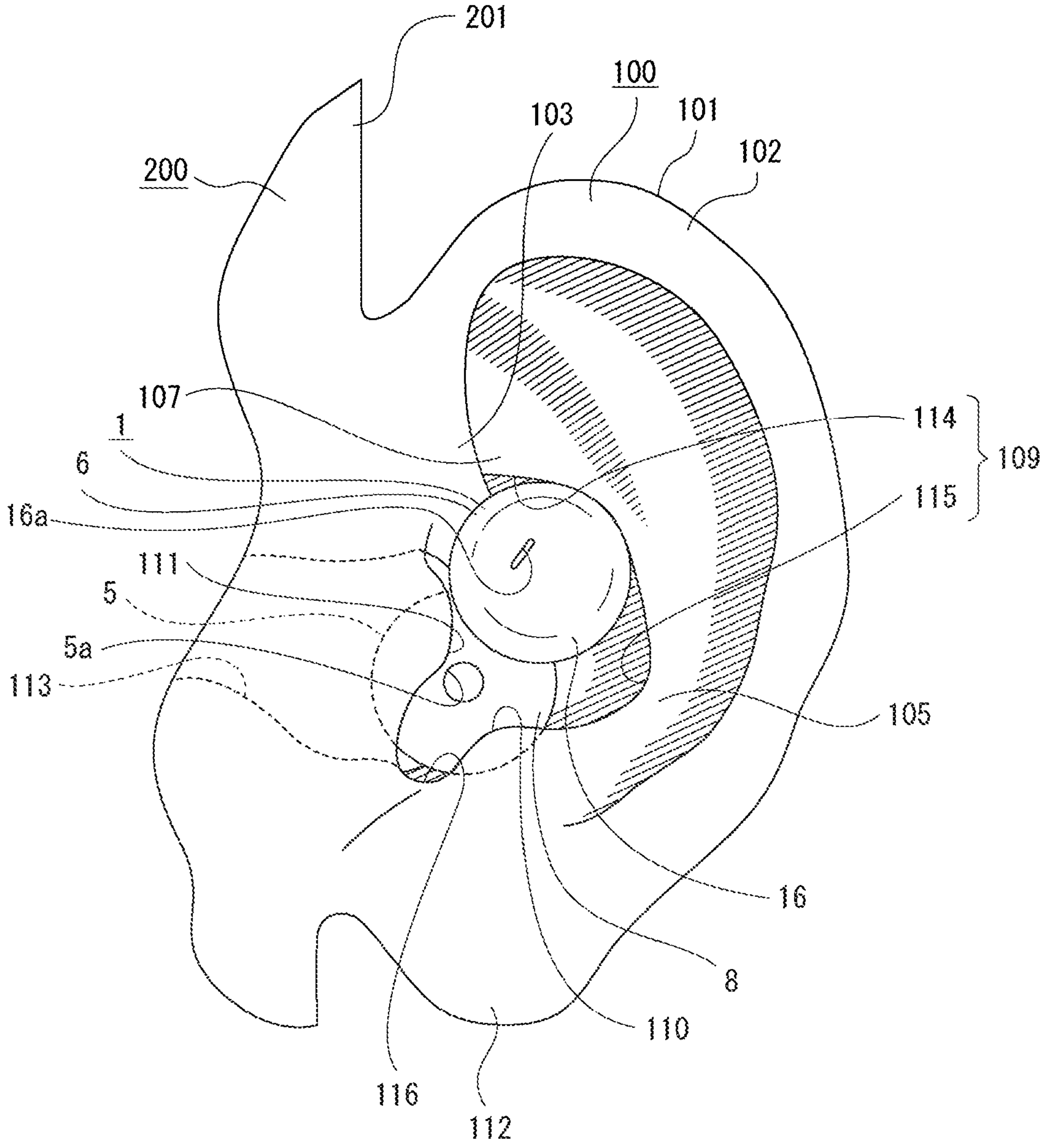
FIG. 6 is a side view illustrating a state in which the sound output device is attached to an ear.
Figure 7:
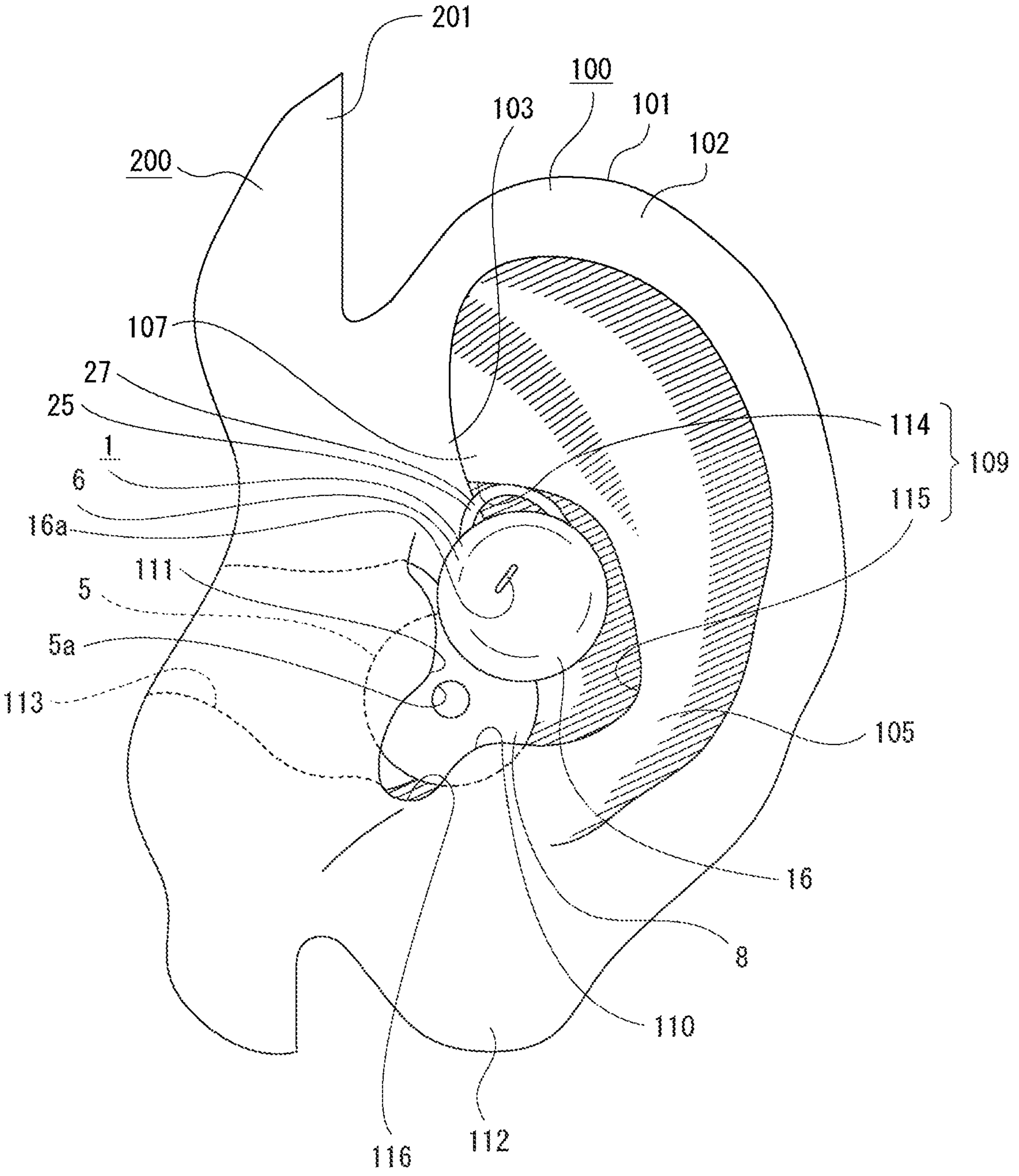
FIG. 7 is a side view illustrating a state in which the sound output device is attached to an ear with an attachment assist body mounted on the sound output device.

Next, the state in which the sound output device 1 is attached to the ear 100 will be described (see FIGS. 6 and 7). It should be noted that, in the following, a state in which the sound output device 1 is attached to the left ear 100 will be described as an example. Depending on the shape and size of the ear 100, the sound output device 1 is attached to the ear 100 in either a state in which the attachment assist body 25 is not attached to the second case 4 or a state in which the attachment assist body 25 is attached to the second case 4.

First, a state in which the sound output device 1 is attached to the ear 100 when the attachment assist body 25 is not attached to the second case 4 will be described (see FIG. 6). In a case where the size of the ear 100 is small, particularly, in a case where the size of the ear concha 109 is small, the sound output device 1 is attached to the ear 100 in a state in which the attachment assist body 25 is not attached to the second case 4.

In the state in which the sound output device 1 is attached to the ear 100, the entire drive unit 5 is inserted into the cavum concha 115. At this time, there are cases where a part of the drive unit 5 is inserted into the intertragic notch 116. The drive unit 5 has the intake hole 5*a* located to correspond to the external auditory canal 113, and parts of the drive unit 5 are inserted into the insides of the tragus 111 and the antitragus 110. The drive unit 5 is held by the tragus 111 and the antitragus 110.

In the state in which the sound output device 1 is attached to the ear 100 as described above, parts of the drive unit 5 are pressed by the tragus 111 and the antitragus 110, so that a state in which the sound output device 1 is attached to the ear 100 in a stable manner can be ensured.

With the sound output device 1 attached to the ear 100, the electric unit 6 is inserted into a space extending from the cavum concha 115 to the cymba concha 114 in the ear concha 109.

In the state in which the sound output device 1 is attached to the ear 100 as described above, the entire drive unit 5 is inserted into the cavum concha 115, and the electric unit 6 is inserted into the space from the cavum concha 115 to the cymba concha 114 at the same time. Therefore, since the entire sound output device 1 is inserted into the ear concha 109, the sound output device 1 is unlikely to fall off the ear 100, and a more stable wearing state of the sound output device 1 on the ear 100 can be ensured.

In the state in which the sound output device 1 is attached to the ear 100, the outer peripheral surface 4*b* of the second case 4 is fitted to the edge of the antihelix lower crus 107, and the crus helicis 103 is located at the step portion D. Therefore, a part of the electric unit 6 is pressed against the edge of the antihelix lower crus 107 and a part of the electric unit 6 is pressed against the crus helicis 103 at the same time, so that a stable wearing state of the electric unit 6 on the ear 100 can be ensured.

Next, the state in which the sound output device 1 is attached to the ear 100 when the attachment assist body 25 is attached to the second case 4 will be described (see FIG. 7). In a case where the size of the ear 100 is large, particularly, in a case where the size of the ear concha 109 is large, the sound output device 1 is attached to the ear 100 with the attachment assist body 25 attached to the second case 4.

In the state in which the sound output device 1 is attached to the ear 100, the entire drive unit 5 is inserted into the cavum concha 115. At this time, there are cases where a part of the drive unit 5 is inserted into the intertragic notch 116. The drive unit 5 has the intake hole 5*a* located to correspond to the external auditory canal 113, and parts of the drive unit 5 are inserted into the insides of the tragus 111 and the antitragus 110. The drive unit 5 is held by the tragus 111 and the antitragus 110.

This state of the drive unit 5 is similar to the state of the drive unit 5 described above of the case where the attachment assist body 25 is not attached to the second case 4.

With the sound output device 1 attached to the ear 100, the electric unit 6 is inserted into the space extending from the cavum concha 115 to the cymba concha 114 in the ear concha 109. At this time, the attachment assist body 25 is also inserted into the space extending from the cavum concha 115 to the cymba concha 114, the support portion 27 is fitted to the edge of the antihelix lower crus 107 to be elastically deformed, and the crus helicis 103 is located at the step portion D.

In the state in which the sound output device 1 is attached to the ear 100 as described above, the support portion 27 of the attachment assist body 25 is pressed by the edge of the antihelix lower crus 107, and a part of the electric unit 6 is pushed against the crus helicis 103 at the same time. Therefore, a stable wearing state of the electric unit 6 on the ear 100 can be ensured.

Further, in the state in which the sound output device 1 is attached to the ear 100, the drive unit 5 and the electric unit 6 are entirely arranged on the ear concha 109, and in the case where the attachment assist body 25 is attached to the electric unit 6, the attachment assist body 25 is also arranged at the ear concha 109.

The drive unit 5 and the electric unit 6 are arranged in the ear concha 109 as described above and thus do not protrude from the auricle 101 to the outside in a state in which the sound output device 1 is attached to the ear 100. Therefore, a stable wearing state of the sound output device 1 without a sense of discomfort can be ensured.

Incidentally, in the state in which the sound output device 1 is attached to the ear 100, a part of the electric unit 6 may be located outside the inner space 150.

In the state in which the sound output device 1 is attached to the ear 100, for example, music data (sound signal) transmitted from an unillustrated wireless communication device is received by an antenna, and the received music data is controlled by the main substrate 19 and the sub-substrate 22 to be output as a sound from the sound output section 9. The sound output from the sound output section 9 reaches the eardrum through the external auditory canal 113. At this time, the external sound is taken in from the intake hole 5*a* and reaches the eardrum through the external auditory canal 113.

An antenna for wireless communication is arranged inside the electric unit 6 as described above, and wireless communication can thus be performed by the antenna. Accordingly, no wired cable is required, so that the usability of the sound output device 1 can be improved.

Note that, although the sound output device 1 having an antenna is described above as an example, the sound output device 1 may be a wired type which has no antenna and in which a sound signal is input via a connection line.

As described above, in the sound output device 1, the electric unit 6 is provided with the attachment assist body 25 which is attachable to and detachable from the electric unit 6 and which can be elastically deformed.

Therefore, the sound output device 1 can be attached to the ear 100 with a part of the attachment assist body 25 being in contact with a part of the ear 100, and the sound output device 1 can be attached to the ear 100 in a stable state regardless of the size and shape of the ear 100.

Further, in the sound output device 1, since the outer surface 3*a* of the drive unit 5 is formed as an outwardly convex curved surface, the curved surface of the drive unit 5 is in contact with various parts of the ear 100 with the sound output device 1 attached to the ear 100, and a comfortable wearing state without any sense of discomfort can be ensured.

Further, in the sound output device 1, since the drive unit 5 is formed in an annular shape, the portion to be inserted into the cavum concha 115 is in an annular shape, and thus, the drive unit 5 can easily be inserted into the cavum concha 115 regardless of the shape and size of the ear 100. Therefore, the sound output device 1 can easily and swiftly be attached to the ear 100, and at the same time, the sound output device 1 can be attached to the ear 100 with comfort at the time when the sound output device 1 is attached to the ear 100.

Moreover, since the outer surface of the electric unit 6 is formed into a curved surface or a flat surface, the curved surface or the flat surface of the electric unit 6 comes into contact with various parts of the ear 100 in a state in which the electric unit 6 is attached to the ear 100, so that a comfortable wearing state without a sense of discomfort can be ensured.

In addition, since the central axis Q of the electric unit 6 is inclined with respect to the central axis P of the drive unit

5 (the central axis of the intake hole 5*a*), the electric unit 6 is positioned to be inclined with respect to the drive unit 5, and the drive unit 5 and the electric unit 6 can each be positioned in the optimum orientation according to the shape of the ear 100, so that a comfortable wearing state without a sense of discomfort can be ensured.

Note that a total length L of the sound output device 1 in the direction in which the central axis P of the drive unit 5 and the central axis Q of the electric unit 6 are connected to each other is preferably 30 mm or less (see FIG. 4). When the total length L is made 30 mm or less, the drive unit 5 is inserted into the cavum concha 115, and at the same time, the electric unit 6 is inserted into the space extending from the cavum concha 115 to the cymba concha 114, regardless of the size of the ear concha 109, so that the sound output device 1 can easily be attached to the ear 100 in a stable state.

Further, when being mounted on the electric unit 6, the attachment assist body 25 is located in a position shifted by a predetermined angle θ with respect to a line segment S connecting the central axis P of the drive unit 5 and the central axis Q of the electric unit 6 to each other, with the central axis Q as the base point. The direction shifted by the angle θ is the direction shifted toward the antihelix lower crus 107 with respect to the antihelix 105. When the attachment assist body 25 is placed in a position shifted by the angle θ, the attachment assist body 25 is held at the edge of the antihelix lower crus 107 in a stable state, and thus, a stable wearing state of the sound output device 1 on the ear 100 can be ensured.

<Modifications>

Modifications of the sound output device 1 will be described below (see FIGS. 8 to 15).

It should be noted that, regarding the modifications described below, since a part of configurations thereof is different from the configuration of the above-described sound output device 1, comparison is made therebetween, and only portions that are different from those of the above-described sound output device 1 will be described in detail. The other portions will be denoted by the same reference signs as those assigned to similar portions in the above-described sound output device 1, and the description thereof will be omitted.

Figure 8:
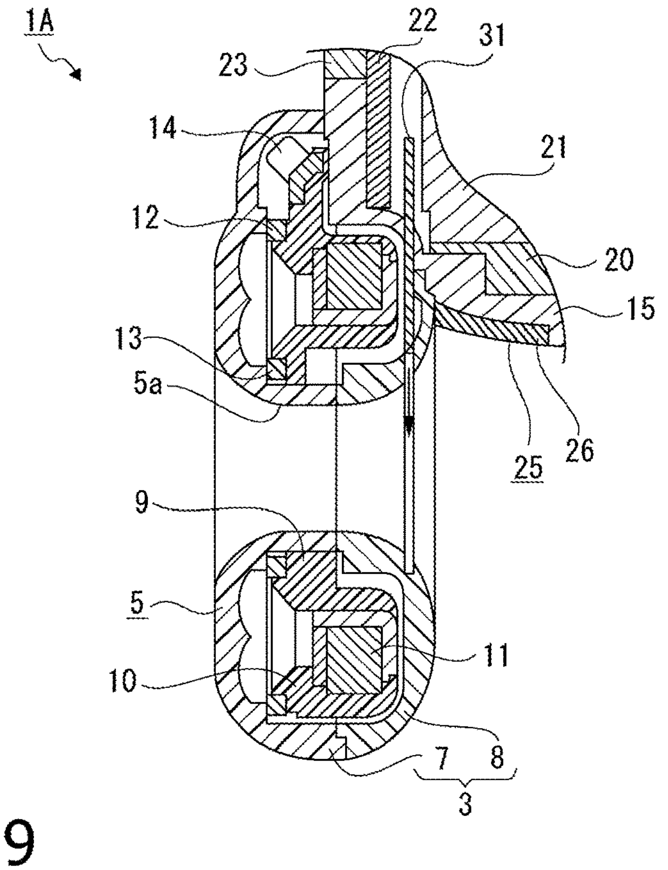
FIG. 8 illustrates a sound output device according to a first modification together with FIG. 9, and is a cross-sectional view illustrating a state in which a first opening/closing lid is in an open position.

First, a sound output device 1A relating to a first modification will be described (see FIGS. 8 and 9). The sound output device 1A is an example in which a first opening/closing lid 31 that opens and closes the intake hole 5*a* is provided.

Figure 9:
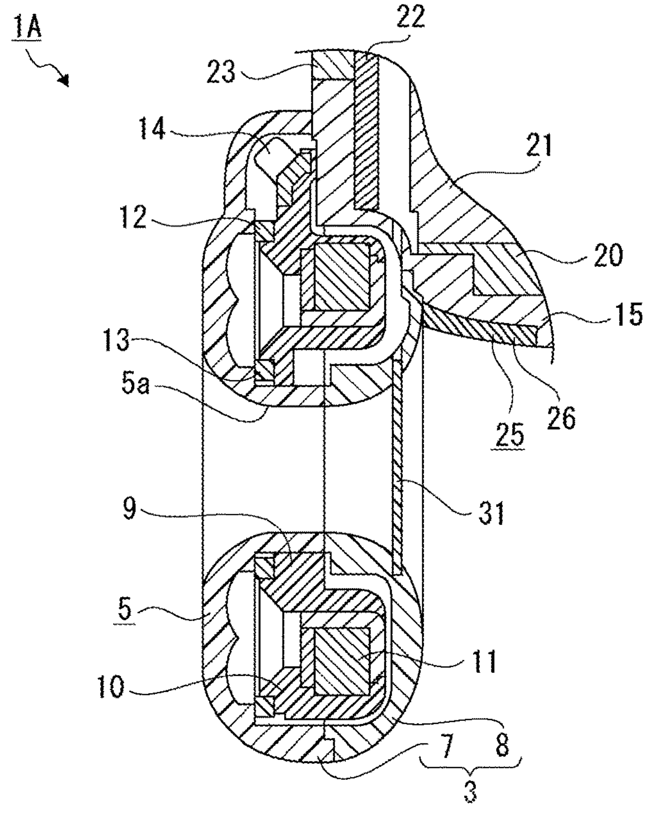
FIG. 9 is a cross-sectional view illustrating a state in which the first opening/closing lid is in a closed position.

The first opening/closing lid 31 is formed in a flat plate shape and is moved (slid) between an open position for holding the intake hole 5*a* open (see FIG. 8) and a closed position for holding the intake hole 5*a* closed (see FIG. 9). The first opening/closing lid 31 is housed inside the electric unit 6 in the open position and holds the intake hole 5*a* closed on the outer housing portion 8 side in the closed position, for example. The first opening/closing lid 31 may be operated by an actuator such as a stepping motor, or may be manually operated by a user. The operation of the first opening/closing lid 31 by the actuator is performed, for example, by operating an unillustrated operation section provided on the sound output device 1A or operating an external wireless communication device.

Figure 10:
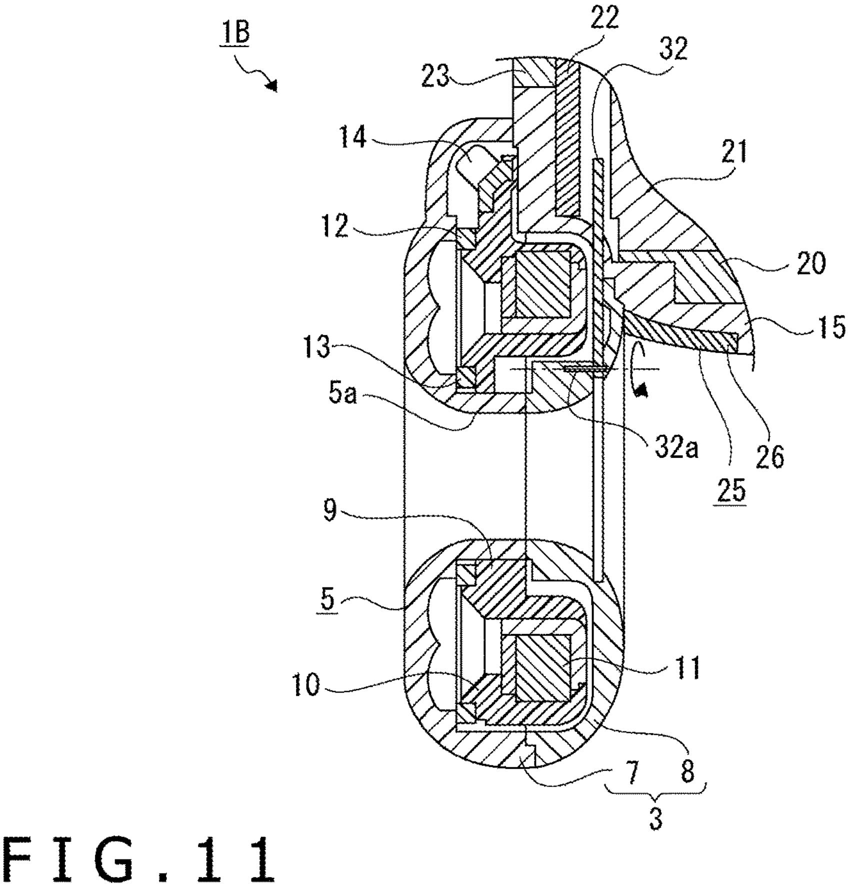
FIG. 10 illustrates a sound output device according to a second modification together with FIG. 11, and is a cross-sectional view illustrating a state in which a second opening/closing lid is in an open position.
Figure 11:
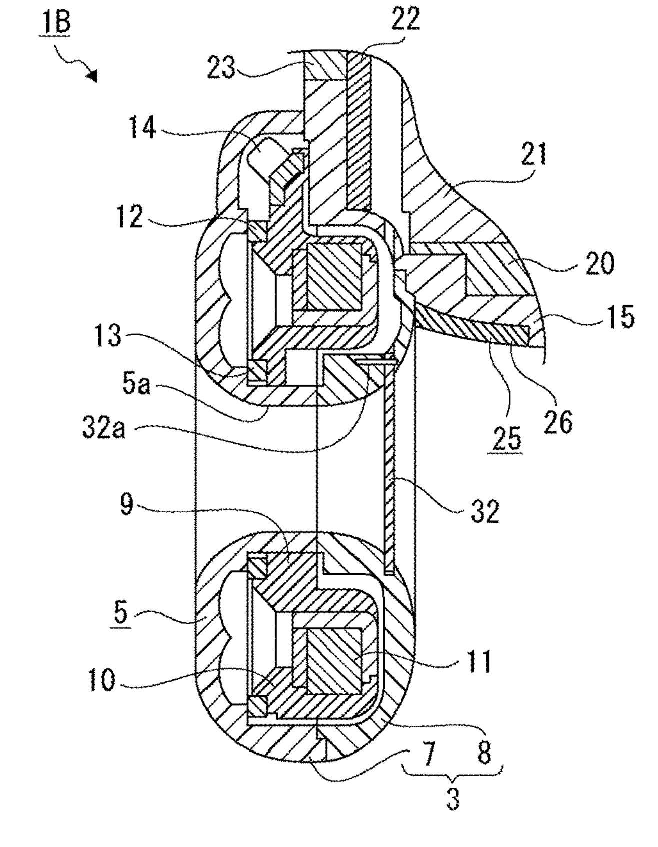
FIG. 11 is a cross-sectional view illustrating a state in which the second opening/closing lid is in a closed position.

Next, a sound output device 1B relating to a second modification will be described (see FIGS. 10 and 11). The sound output device 1B is an example in which a second opening/closing lid 32 that opens and closes the intake hole 5*a* is provided.

The second opening/closing lid 32 is formed in a flat plate shape, and is rotated (turned) with a fulcrum shaft 32*a* provided inside the electric unit 6 as a fulcrum, between the open position (see FIG. 10) for holding the intake hole 5*a* open and the closed position (see FIG. 11) for holding the intake hole 5*a* closed. In the open position, for example, a part of the second opening/closing lid 32 is housed inside the electric unit 6, and the intake hole 5*a* is closed on the outer housing portion 8 side in the closed position. The second opening/closing lid 32 may be operated by an actuator such as a stepping motor, or may be manually operated by the user. The operation of the second opening/closing lid 32 by the actuator is performed, for example, by operating an unillustrated operation section provided on the sound output device 1B or operating an external wireless communication device.

Figure 12:
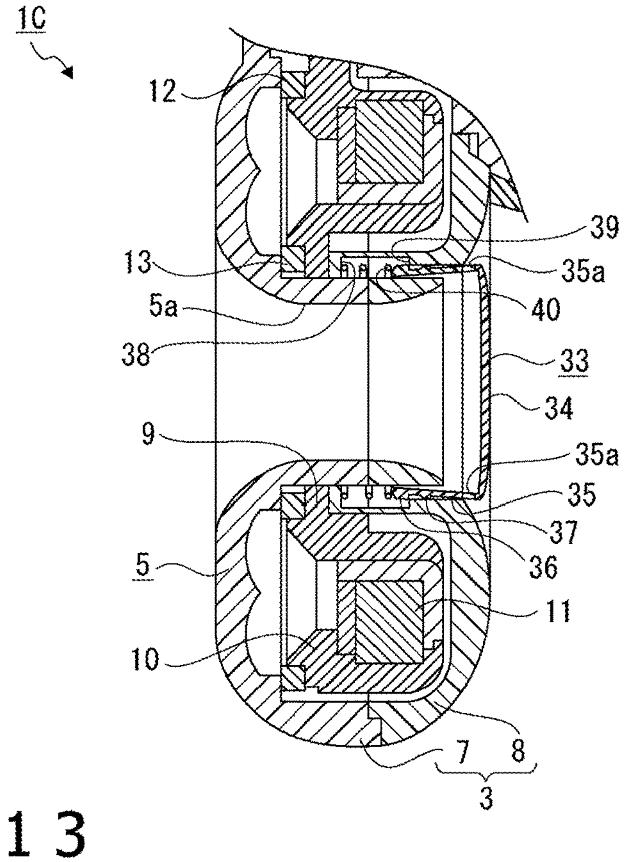
FIG. 12 illustrates a sound output device according to a third modification together with FIG. 13, and is a cross-sectional view illustrating a state in which a third opening/closing lid is in an open position.
Figure 13:
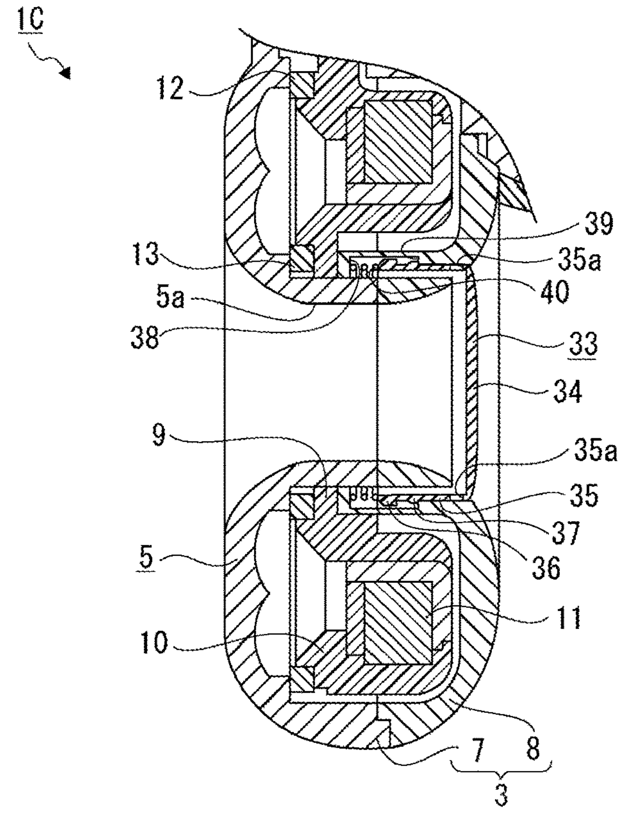
FIG. 13 is a cross-sectional view illustrating a state in which the third opening/closing lid is in a closed position.

Next, a sound output device 1C relating to a third modification will be described (see FIGS. 12 and 13). The sound output device 1C is an example in which a third opening/closing lid 33 that opens and closes the intake hole 5*a* is provided.

The third opening/closing lid 33 has a base surface portion 34 formed in a disk shape and a cylindrical peripheral surface portion 35 projecting from the outer periphery of the base surface portion 34 in a direction perpendicular to the base surface portion 34. A first locking protrusion 36 and a second locking protrusion 37 that extend in the circumferential direction are provided on the outer peripheral surface of the peripheral surface portion 35, the first locking protrusion 36 is provided at the tip portion, and the second locking protrusion 37 is provided at a position closer to the base surface portion 34. Sound passage holes 35*a* are formed at the end portion on the base surface portion 34 side of the peripheral surface portion 35 to be separated from each other in the circumferential direction.

The first case 3 of the drive unit 5 has a support hole 38 opened on the outer housing portion 8. The support hole 38 is opened in a part of the outer arrangement portion 16 in the right-left direction.

A locking notch 39 that is located in the support hole 38 and extends in the circumferential direction is formed on the first case 3. A compression coil spring 40 is arranged in the support hole 38.

The peripheral surface portion 35 of the third opening/closing lid 33 is inserted into the support hole 38 and is supported by the first case 3 to be movable in the axial direction of the intake hole 5*a*. The third opening/closing lid 33 is moved between the open position (see FIG. 12) for holding the intake hole 5*a* open and the closed position (see FIG. 13) for holding the intake hole 5*a* closed, and is urged to move to the open position by the urging force of the compression coil spring 40.

In the third opening/closing lid 33, the first locking protrusion 36 is locked to the locking notch 39 at the open position, and the sound passage holes 35*a* are located outside the support hole 38. Therefore, at the open position, the intake hole 5*a* and the sound passage holes 35*a* communicate with each other, and the external sound taken in from the intake hole 5*a* passes through the sound passage holes 35*a* toward the external auditory canal 113.

Meanwhile, the second locking protrusion 37 of the third opening/closing lid 33 is locked to the locking notch 39 at the closed position, and the sound passage holes 35*a* are located in the support hole 38. Thus, at the closed position, the intake hole 5*a* and the sound passage holes 35*a* do not communicate with each other, and the intake hole 5*a* is closed by the third opening/closing lid 33, so that the external sound is not taken through the intake hole 5*a*.

As described above, in the sound output devices 1A, 1B, and 1C relating to the first modification, the second modification, and the third modification, the first opening/closing lid 31, the second opening/closing lid 32, or the third opening/closing lid 33 that opens and closes the intake hole 5*a* is provided.

Therefore, since the intake hole 5*a* is opened and closed by the first opening/closing lid 31, the second opening/closing lid 32, and the third opening/closing lid 33, the intake hole 5*a* is opened and closed according to the usage mode desired by the user, and a favorable listening state of the sound can be ensured regardless of the usage mode.

For example, in a case where it is desired to hear, indoors or in other areas, only the sound output from the sound output section 9, by closing the intake hole 5*a* with the first opening/closing lid 31, second opening/closing lid 32, or third opening/closing lid 33, it is possible to listen to the sound output from the sound output section 9 with high sound quality, without hearing external sounds.

On the other hand, in the case where it is desired to hear, outdoors or in other areas, the sound output from the sound output section 9 and an external sound, holding the intake hole 5*a* open with the first opening/closing lid 31, the second opening/closing lid 32, or the third opening/closing lid 33 makes it possible for the sound output from the sound output section 9 and the external sound to be heard at the same time, and it is possible to listen to the sound output from the sound output section 9 while ensuring the safety by taking in the external sound.

Further, in the first modification and the second modification, the first opening/closing lid 31 and the second opening/closing lid 32 that each open/close the intake hole 5*a* are stored in the electric unit 6 in the open position where the first opening/closing lid 31 and the second opening/closing lid 32 each keep the intake holes 5*a* open.

Therefore, since the first opening/closing lid 31 and the second opening/closing lid 32 are not located outside the drive unit 5 and the electric unit 6 in the open position, the sound output device 1 can be miniaturized, and at the same time, the first opening/closing lid 31 and the second opening/closing lid 32 can be protected.

Figure 14:
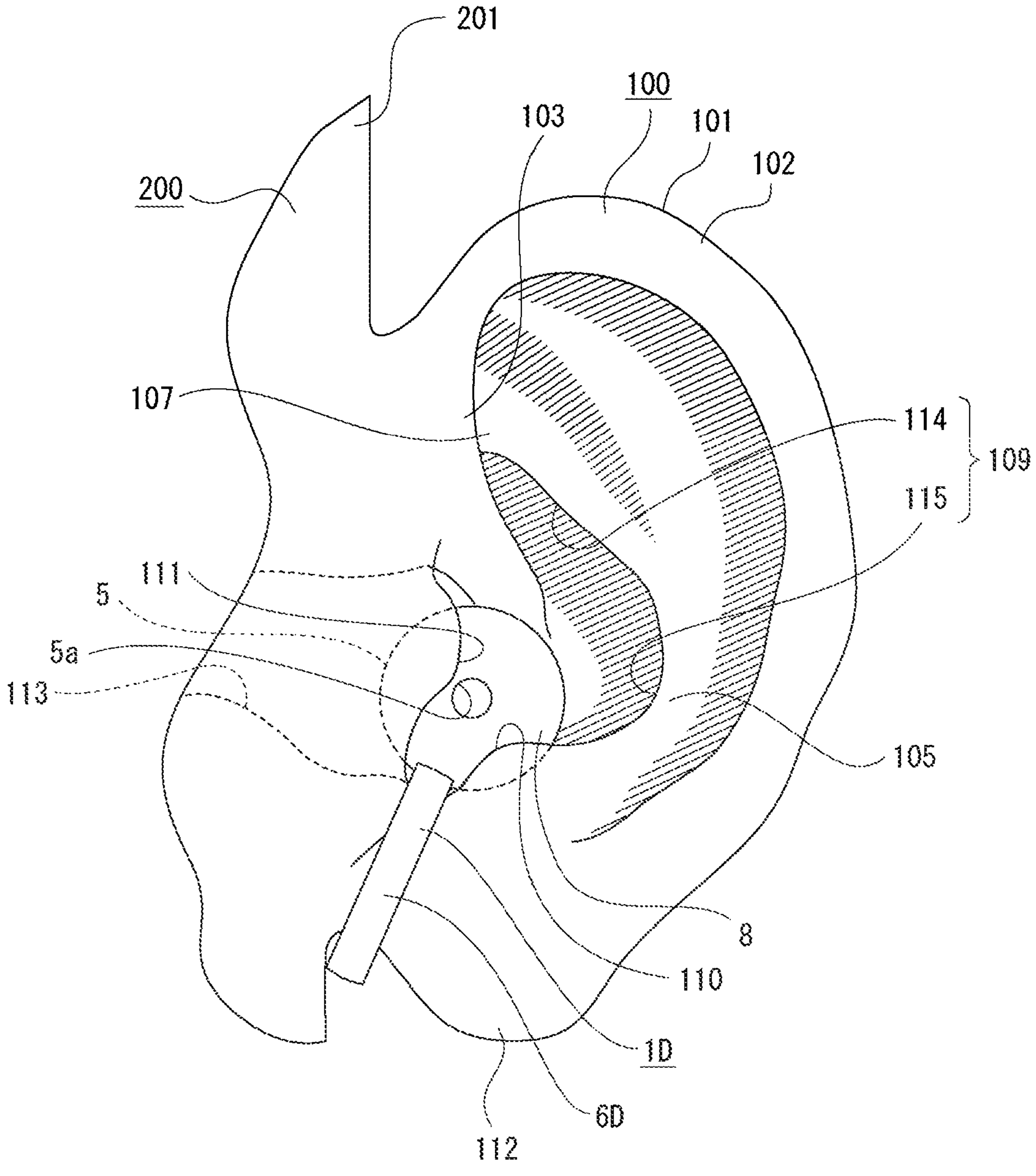
FIG. 14 is a side view illustrating a state in which a sound output device according to a fourth modification is attached to an ear.

Next, a sound output device 1D relating to the fourth modification will be described (see FIG. 14).

In the sound output device 1D, an electric unit 6D is formed in a rod shape (straight line shape), and one end of the electric unit 6D in the longitudinal direction is coupled to the drive unit 5. Therefore, the electric unit 6D is in a state of protruding from the drive unit 5. The sound output device 1D is attached to the ear 100 in a state in which the entire drive unit 5 is inserted into the cavum concha 115 and the electric unit 6D is positioned at the boundary with the temporal region 201 on the earlobe 112.

Since the electric unit 6D of the sound output device 1D is formed in a rod shape, the size of the sound output device 1D is reduced.

Figure 15:
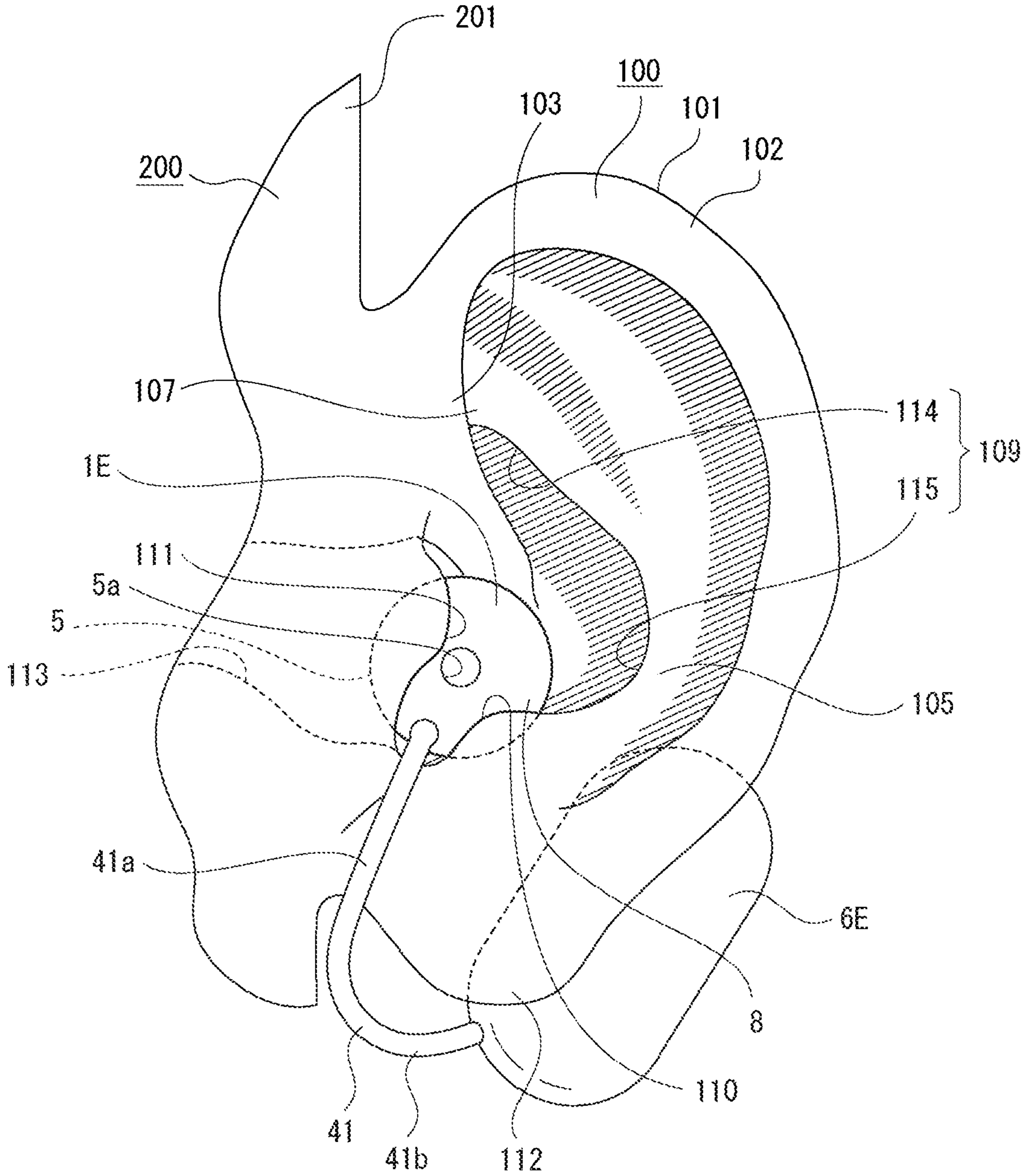
FIG. 15 is a side view illustrating a state in which a sound output device according to a fifth modification is attached to an ear.

Next, a sound output device 1E relating to the fifth modification will be described (see FIG. 15).

In the sound output device 1E, an electric unit 6E is coupled to the drive unit 5 via a linear (tubular) intermediate joint portion 41. The intermediate joint portion 41 includes a straight portion 41*a* extending in one direction and a curved portion 41*b* formed in a substantially arc shape being continuously formed, one end of the straight portion 41*a* is coupled to the drive unit 5, and one end of the curved portion 41*b* is coupled to the electric unit 6E. The electric unit 6E has an oval outer shape, for example, but the shape of the electric unit 6E can be any shape.

Inside the intermediate joint portion 41, electric wires and signal lines connecting the sound output section 9 disposed inside the drive unit 5 and the drive control section 17 disposed inside the electric unit 6E to each other are arranged. Further, the intermediate joint portion 41 may function as a sound conduit.

A sound output device 1E is attached to the ear 100 in a state in which the entire drive unit 5 is inserted into the cavum concha 115, the straight portion 41*a* of the intermediate joint portion 41 is located at the boundary with the temporal region 201 on the earlobe 112, the curved portion 41*b* of the intermediate joint portion 41 is wrapped around the earlobe 112 from below, and at least a part of the electric unit 6E is located on the back side of the auricle 101.

Since the sound output device 1E is attached to the ear 100 in such a manner that the auricle 101 is sandwiched between the drive unit 5 and the electric unit 6E from the front and back, a stable wearing state is ensured.

It is to be noted that the intermediate joint portion 41 may be made of a material that is not elastically deformable, elastically deformable, or deformable but not elastically deformable. Since the intermediate joint portion 41 is formed of an elastically deformable or deformable material, the user can deform the intermediate joint portion 41 into any shape when attaching the sound output device 1E to the ear 100, and can easily attach the sound output device 1E to the ear 100.

Others

Figure 16:
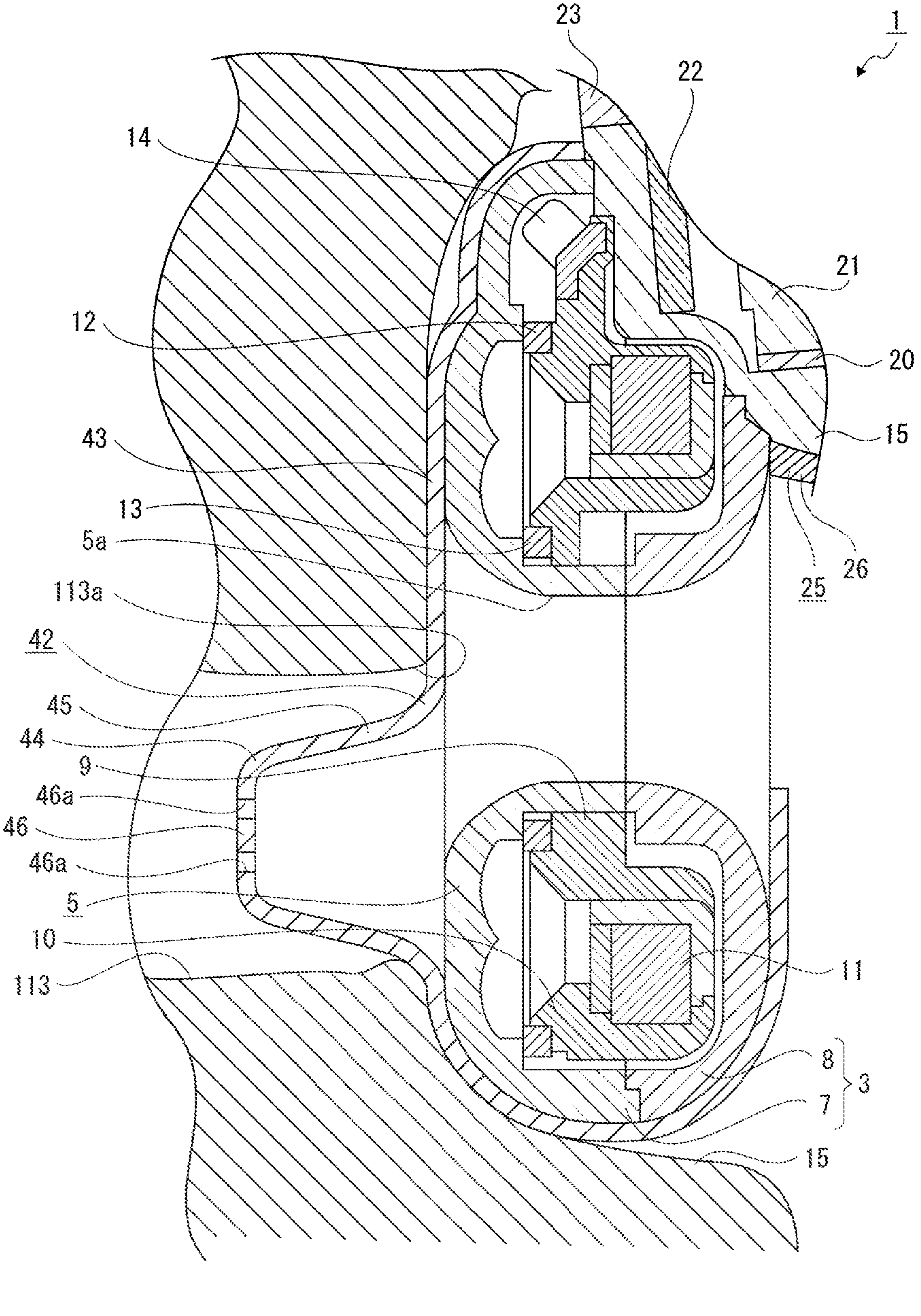
FIG. 16 is a cross-sectional view illustrating a state in which a sound output device with a cap mounted thereon is attached to an ear.

The drive unit 5 of the sound output device 1 (including the sound output devices 1A, 1B, 1C, 1D, and 1E; the same applies hereinafter) can be equipped with a cap 42 formed in a predetermined shape (See FIG. 16).

The cap 42 is substantially entirely formed of an elastically deformable material such as silicon or rubber, for example, and has a cover portion 43 attached to cover a part of the sound output device 1 and an insertion portion 44 protruding in a predetermined direction with respect to the cover portion 43.

The cover portion 43 is formed in a bag shape that covers the drive unit 5, is elastically deformed and stretched before being attached to the sound output device 1, and is elastically restored at the time of being attached to the drive unit 5, for example, to be brought into close contact with the outer surface 3*a* of the first case 3 of the drive unit 5. The insertion portion 44 has a peripheral portion 45 which protrudes from a part of the cover portion 43 and whose diameter decreases toward the tip and a block portion 46 whose outer periphery is continuous with the tip of the peripheral portion 45, and sound holes 46*a* are formed on the block portion 46. Incidentally, the cap 42 may be provided with a portion having a sound quality adjusting function such as an equalizer.

In a state in which the cover portion 43 is in close contact with the outer surface 3*a* of the first case 3 and the cap 42 is attached to the drive unit 5, one opening side of the intake hole 5*a* is not covered with the cover portion 43, and at the same time, the intake hole 5*a* communicates with the internal space of the insertion portion 44.

In the cap 42 attached to the sound output device 1, the insertion portion 44 is inserted into the external auditory canal 113 in a state in which the sound output device 1 is attached to the ear 100. Therefore, the external sound taken in from the intake hole 5*a* passes through the internal space of the insertion portion 44, and passes through the external auditory canal 113 from the sound holes 46*a* toward the eardrum.

By such a cap 42 being attached to the sound output device 1, the range of usage of the sound output device 1 is widened, and the usability of the sound output device 1 can be improved. In particular, since the cap 42 has the insertion portion 44 to be inserted into the external auditory canal 113, the insertion portion 44 functions as an earpiece, and the sound output device 1 can efficiently transmit a low-pitched sound to the external auditory canal 113.

Further, in the sound output device 1, in addition to the dynamic type sound output section 9, a single or multiple balanced armature type speaker units may be provided, and the setting of a balanced armature type speaker unit makes it possible to reinforce the delicate reproducibility on the high frequency side and the reproducibility of the low-pitched sound, so that the sound quality in the sound output device 1 can be improved.

Further, the sound output device 1 may be provided with a single sensor or multiple sensors. As the sensor, for example, a type having a function of measuring the pulse rate of the user, a function of measuring the blood oxygen concentration of the user, or the like is used. By such a sensor being provided, the sound output device 1 can also be used as a health device, and the functionality of the sound output device 1 can be improved.

SUMMARY

As described above, the sound output device 1 has the drive unit 5 that is formed in an annular shape and that has the sound output section 9 inside and the electric unit 6 that is coupled to the drive unit 5 and that has the drive control section 17 inside, and the space inside the drive unit 5 is formed as the intake hole 5*a* for taking in an external sound. The sound output device 1 is attached to the ear 100 with the drive unit 5 inserted into the cavum concha 115.

Therefore, since the external sound taken in from the intake hole 5*a* which is an inner space of the drive unit 5 goes to the external auditory canal 113 in a state in which the electric unit 6 is coupled to the drive unit 5 and the drive unit 5 is inserted into the cavum concha 115 to be attached to the ear 100, a stable and favorable wearing state on the ear 100 can be ensured, and at the same time, a state in which the external sound is naturally taken in can be ensured.

In particular, since the entire drive unit 5 is inserted into the cavum concha 115 and attached to the ear 100, high stability can be ensured regarding the state of attachment to the ear 100, and since the external sound is taken in from the intake hole 5*a*, which is a path different from the path of the sound output from the sound output section 9, the external sound can be taken in with a natural sound quality.

Further, unlike a canal type sound output device having an earpiece, the earpiece is not attached to the ear 100 while being supported by the external auditory canal 113, so that a load is unlikely to be applied to the external auditory canal 113 in a state in which the sound output device 1 is attached to the ear 100, and thus, it is possible to prevent the generation of a feeling of oppression and a feeling of fatigue on the ear 100 and to ensure a state in which the sound output device 1 is attached to the ear 100 with comfort for a long time.

Further, in the sound output device 1, the electric unit 6 is coupled to the drive unit 5 at a portion at which the intake hole 5*a* is not blocked.

Therefore, since the entire intake hole 5*a* is opened without being blocked by the electric unit 6, the external sound taken in through the intake hole 5*a* and the sound output from the sound output section 9 can be heard favorably, and a favorable listening state of each sound can be ensured.

Moreover, in the sound output device 1, the electric unit 6 is coupled to the drive unit 5 in a state in which a part of the electric unit 6 overlaps the drive unit 5 in the axial direction of the intake hole 5*a*.

Therefore, since the step portion D is formed between the drive unit 5 and the electric unit 6, the electric unit 6 is pressed against the crus helicis 103 without a sense of discomfort in the state of being attached to the ear 100, and a state in which the sound output device 1 is attached to the ear 100 in a comfortable and stable manner can be ensured.

Note that the sound output device 1 may be provided with an acceleration sensor. By the acceleration sensor being provided, it becomes possible to execute various functions according to an operation (tapping operation) performed on the sensing operation section.

For example, in a case where left and right operation sections are provided, the music (sound) reproducing function and the stop function are alternately executed by the operation section on the right side being operated once, the music feed function is executed by the operation section on the right side being operated twice, and the music return function is executed by the operation section on the right side being operated three times. Further, the function of increasing the volume of music is executed by the operation section on the left side being operated once, and the function of decreasing the volume of music is executed by the operation section on the left side being operated twice.

The assignment of functions executed in response to the above-described operations of the left and right operation sections is an example, and the assignment of functions to the left and right operation sections may be freely settable by the user by operation of an external wireless communication device.

<Present Technique>

The present technique can be configured as follows.

(1)

A sound output device including:

a drive unit that has a sound output section inside and is formed in an annular shape; and an electric unit that has a drive control section inside and is coupled to the drive unit, in which a space inside the drive unit is formed as an intake hole that takes in an external sound, and the sound output device is attached to an ear with the drive unit inserted into a cavum concha.

(2)

The sound output device described in the above item (1), in which the electric unit is coupled to the drive unit at a portion at which the intake hole is not blocked.

(3)

The sound output device described in the above item (2), in which the electric unit is coupled to the drive unit in a state in which a part of the electric unit overlaps the drive unit in an axial direction of the intake hole.

(4)

The sound output device described in any one of the above items (1) to (3), in which the drive unit and the electric unit are arranged at an ear concha with the sound output device attached to the ear.

(5)

The sound output device described in any one of the above items (1) to (4), in which an outer surface of the drive unit is formed in a curved surface.

(6)

The sound output device described in any one of the above items (1) to (5), in which an outer surface of the electric unit is formed in a curved surface or a flat surface.

(7)

The sound output device described in any one of the above items (1) to (6), in which the electric unit is formed in a shape having a central axis, and the central axis of the electric unit is inclined with respect to a central axis of the intake hole.

(8)

The sound output device described in any one of the above items (1) to (7), in which the drive unit is formed in an annular shape.

(9)

The sound output device described in any one of the above items (1) to (8), further including:

an opening/closing lid that opens and closes the intake hole.

(10)

The sound output device described in the above item (9), in which the opening/closing lid is housed in the electric unit at an open position where the intake hole is open.

(11)

The sound output device described in any one of the above items (1) to (10), further including:

an attachment assist body that is provided on the electric unit to be attachable to and detachable from the electric unit and is made elastically deformable.

(12)

The sound output device described in any one of the above items (1) to (11), further including:

an antenna for wireless communication arranged inside the electric unit.

REFERENCE SIGNS LIST

100: Ear
101: Auricle
109: Ear concha
115: Cavum concha
1: Sound output device
5: Drive unit
6: Electric unit
9: Sound output section
17: Drive control section
25: Attachment assist body
1A: Sound output device
31: First opening/closing lid
1B: Sound output device
32: Second opening/closing lid
1C: Sound output device
33: Third opening/closing lid
1D: Sound output device
6D: Electric unit
1E: Sound output device
6E: Electric unit
D: Step portion

The invention claimed is:

1. A sound output device, comprising:

a drive unit that includes a sound output section inside, wherein the drive unit has an annular shape; and an electric unit that includes a drive control section inside, wherein the electric unit is coupled to the drive unit, wherein a space inside the drive unit is formed as an intake hole that takes in an external sound, the intake hole is a through hole that extends in an axial direction of the drive unit, and the sound output device is attachable to an ear with the drive unit inserted into a cavum concha.

2. The sound output device according to claim 1, wherein the electric unit is coupled to the drive unit at a portion at which the intake hole is unblocked.

3. The sound output device according to claim 2, wherein the electric unit is coupled to the drive unit in a state in which a part of the electric unit overlaps the drive unit in the axial direction of the drive unit.

4. The sound output device according to claim 1, wherein the drive unit and the electric unit are arranged at an ear concha with the sound output device attached to the ear.

5. The sound output device according to claim 1, wherein an outer surface of the drive unit has a curved surface.

6. The sound output device according to claim 1, wherein an outer surface of the electric unit has a curved surface or a flat surface.

7. The sound output device according to claim 1, wherein the electric unit has a shape having a central axis, and the central axis of the electric unit is inclined with respect to a central axis of the intake hole.

8. The sound output device according to claim 1, further comprising an opening/closing lid configured to open and close the intake hole.

9. The sound output device according to claim 8, wherein the opening/closing lid is housed in the electric unit at an open position where the intake hole is open.

10. The sound output device according to claim 1, further comprising:

an attachment assist body that is provided on the electric unit to be attachable to and detachable from the electric unit, wherein the attachment assist body is elastically deformable.

11. The sound output device according to claim 1, further comprising:

an antenna configured to perform wireless communication, wherein the antenna is inside the electric unit.

* * * * *